June 24, 1930.  E. F. BLISS  1,768,393

AUTOMATIC RECLOSING CIRCUIT BREAKER SYSTEM

Filed Aug. 30, 1929

Inventor:
Elmer F. Bliss,
by Charles O. Tullar
His Attorney.

Patented June 24, 1930

1,768,393

UNITED STATES PATENT OFFICE

ELMER F. BLISS, OF SCOTIA, NEW YORK, ASSIGNOR TO GENERAL ELECTRIC COMPANY, A CORPORATION OF NEW YORK

AUTOMATIC RECLOSING CIRCUIT-BREAKER SYSTEM

Application filed August 30, 1929. Serial No. 389,583.

My invention relates to automatic reclosing circuit breaker systems and particularly to a system for controlling the reclosing of a circuit breaker between a source of alternating current and a load circuit which normally has connected thereto a load consisting principally of tungsten lamps.

Due to the relatively high positive temperature resistance coefficient of tungsten it is impossible to obtain a true indication of the impedance of a load circuit under normal voltage conditions, by merely impressing across the load circuit a relatively low voltage. Therefore the well known feeling-out type of automatic reclosing circuit breaker system in which the reclosing of the circuit breaker is effected in response to either the amount of feeling-out current supplied to the load circuit when a relatively low voltage is impressed across the load circuit or the voltage drop produced across the load circuit by the feeling-out current is not entirely satisfactory because the small voltage, impressed across the lamps, does not heat them up sufficiently to increase their resistance to their normal value and, therefore, the amount of feeling-out current that flows through the load circuit does not give a true indication of the amount of current that will flow when the circuit breaker is reclosed and normal voltage is impressed across the load circuit.

One object of my invention is to provide an arrangement for reclosing a circuit breaker between an alternating current source and a load circuit having a relatively large lamp load connected thereto which will differentiate between a normal lamp load which, when cold, has an abnormally low impedance and a short-circuit which produces a corresponding low impedance across the load circuit so that the circuit breaker is reclosed in response to the lamp load but is not reclosed when the short circuit is connected across the load circuit.

My invention will be better understood from the following description when taken in connection with the accompanying drawing and its scope will be pointed out in the appended claims.

Figure 1:
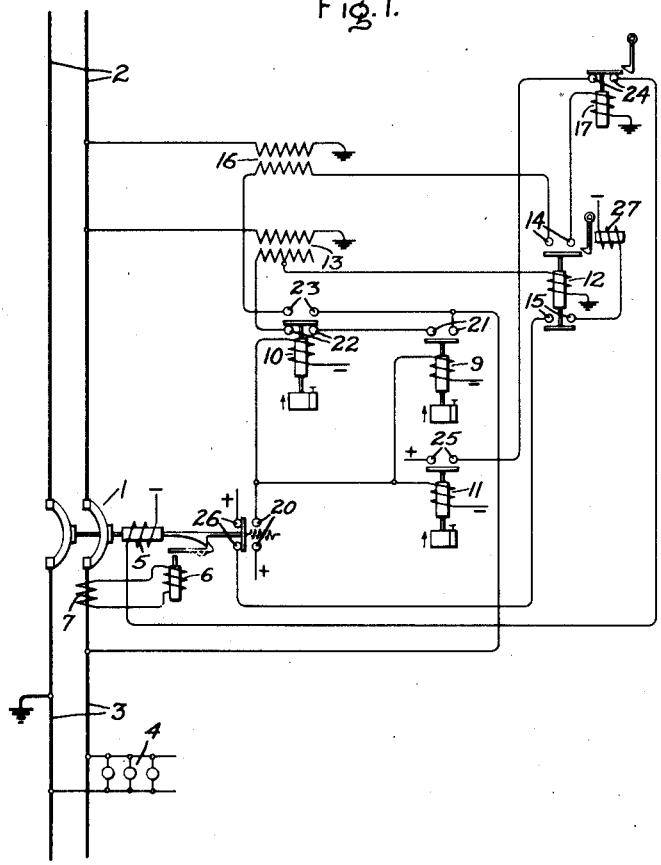
Figure 2:
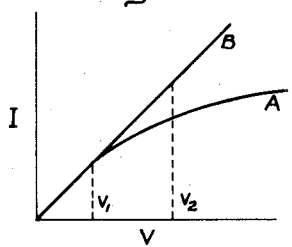

In the accompanying drawing, Fig. 1 is a diagrammatic showing of an automatic reclosing circuit breaker system embodying my invention and Fig. 2 is an explanatory diagram.

Referring to Fig. 1, 1 represents a circuit breaker which is arranged to connect an alternating current supply circuit 2 to a load circuit 3 which has connected thereto a large lamp load 4. The circuit breaker 1 may be of any suitable type, examples of which are well known in the art. As shown in the drawing, the circuit breaker 1 is of the well known latched-in type and is provided with a closing coil 5 and a trip coil 6 which is energized by means of a current transformer 7 so that it is energized in response to the current flowing through the circuit breaker 1 and effects the opening of the circuit breaker when the current through the circuit breaker exceeds a predetermined value.

After the circuit breaker 1 has been opened in response to an abnormal condition on the load circuit 3 it is desirable to reclose the circuit breaker 1 as soon as the load conditions are such that the circuit breaker 1 will not open immediately after it is reclosed. In order to do this it is necessary to obtain some indication of the load conditions existing on the load circuit and in accordance with my invention I provide an improved arrangement for accomplishing this result which consists in first applying a relatively low voltage across the load circuit and then applying a relatively high voltage across the load circuit and controlling the reclosing of the circuit breaker in accordance with the relative values of the currents that flow through the load circuit due to these two voltages. If, for example, the second voltage impressed across the load circuit is double the first voltage and there is a short-circuit across the load circuit, the current that flows when the high voltage is impressed across the load circuit is substantially twice the amount of current that flows when the lower voltage is impressed across the load circuit because of the relatively low positive temperature resistance of an ordinary short circuit or fault. If, however, there is no short-circuit and the load connected to the load circuit consists principally of tungsten lamps, the current that flows when the higher voltage is impressed across the load circuit will be materially less than twice the current that flows when the lower voltage is impressed across the load circuit due to the relatively high positive temperature resistance coefficient of the lamps. This feature will be seen more clearly by referring to Fig. 2 in which curve A represents the volt-ampere characteristic of a load circuit which has a given load consisting principally of tungsten lamps connected thereto and curve B represents the volt-ampere characteristic of the same load circuit with the same value of load produced principally by a short circuit connected thereto. When the voltage is increased from $V_1$ to $V_2$ it will be observed that the increase in current through the load circuit under short-circuit conditions is much greater than the current increase under normal load conditions.

In accordance with my invention I make use of this difference in the amount of current change produced by a given voltage change as a means for controlling the reclosing the circuit breaker. If the change in current produced by a given voltage change is less than a predetermined percent, the circuit breaker is reclosed. If, however, the change is more than a predetermined percent, the circuit breaker is not reclosed.

In the embodiment of my invention shown in the drawing the opening of the switch 1 effects the energization of three time relays 9, 10, and 11, which are designed to operate successively in the order named. The time relay 9 effects the connection of a suitable source of relatively low voltage across the load circuit 3. In series with the low voltage source is connected a current relay 12 which is designed to operate in response to a value of current which flows in case load impedance is less than a predetermined value when the relay 9 closes its contacts 21. As shown in the drawing, the low voltage source is the secondary winding of a potential transformer 13 the primary winding of which is connected across the supply circuit 2. If the load impedance is below a predetermined value at the time the relay 9 operates, sufficient current flows through the relay 12 to cause it to close its contacts 14 and 15 respectively.

After the relay 9 has operated, the relay 10 operates and effects the disconnection of the relay 12 and the secondary of the transformer 13 from across the load circuit 3 and effects the connection of a relatively high voltage source across the load circuit if the relay 12 has previously closed its contacts 14. As shown in the drawing, the relatively high voltage source is the secondary winding of a potential transformer 16 the primary of which is connected across the supply circuit 2. In series with the secondary winding of the transformer 16 and the load circuit I provide the current relay 17. This relay 17 is designed so that it opens its contacts in response to a value of current which is a predetermined percent greater than the current required to operate the relay 12. Therefore, if there is either a short circuit, or an abnormal lamp load is connected to the load circuit when the relay 10 closes its contacts 23 sufficient current flows through the coil of relay 17 to cause it to operate.

If the current through the relay 17 is not sufficient to cause the relay to open its contacts, the subsequent operation of the time relay 11 is arranged to complete the circuit for the closing coil 5 to close the circuit breaker 1. If however the relay 17 is operated, the subsequent operation of the time relay 11 does not effect the reclosing of the circuit breaker 1.

The operation of the arrangement shown in the drawing is as follows: When an abnormal current condition occurs on the load circuit, sufficient current flows through the trip coil 6 to effect the opening of the circuit breaker 1. As soon as the circuit breaker 1 opens, so that its auxiliary contacts 20 are closed, a circuit is completed for the operating windings of the time relays 9, 10 and 11. After the circuit breaker 1 has remained open for a predetermined length of time, the time relay 9 closes its contacts 21 and completes a circuit from one side of the load circuit through the coil of the relay 12, secondary winding of the transformer 13, contacts 22 of the time relay 10, contacts 21 of the time relay 9 to the other side of the load circuit 3. If the impedance of the load circuit is below a predetermined value after the relay 9 closes its contacts 21 sufficient current flows through the relay 12 to cause it to close its contacts 14 and 15. Preferably the relay 12 is of a type well known in the art as an electrically reset lockout relay, so that after the operating winding thereof is deenergized, it remains in its energized position until a reset winding therefor is energized.

After the secondary winding 13 has been connected to the load circuit for a sufficient length of time to allow the lamp connected to the load circuit to become heated, the relay 10 operates and by opening its contacts 22 disconnects the low voltage secondary winding of the transformer 13 from across the load circuit 3. The relay 10 by closing its contacts 23 completes a circuit from one side of the load circuit 3 through the coil of relay 17, contacts 14 of relay 12, secondary winding of the transformer 16, contacts 23, to the other side of the load circuit 3. If the abnormal impedance of the load circuit which causes the relay 12 to operate was due to a normal lamp load, the amount of current that flows through the relay 17 when the relay 10 operates is not sufficient to cause the relay 17 to open its contacts 24. If, however, the abnormal impedance was due to a short-circuit on the load circuit or an abnormal lamp load, sufficient current flows through the relay 17 to open its contacts 24. Therefore, when the relay 11 subsequently closes its contacts 25, the circuit of the closing coil 5 is completed through contacts 24 of relay 17 of there is no short-circuit across the load circuit 3 and is not completed if there is a short-circuit or an abnormal lamp load. Preferably the relay 24 is designed so that it is held in its operated position until it is reset by hand.

When the circuit breaker 1 recloses, its auxiliary contacts complete an energizing circuit for reset winding 27 to reset the relay 12.

It will be observed that the load impedance may be sufficiently high after the circuit breaker opens to prevent both of the relays 12 and 17 from picking up. The circuit breaker 1, however, is reclosed under such conditions when time relay 11 closes its contacts 25 since the contacts 24 of the relay 17 are closed.

While I have, in accordance with the patent statutes, shown and described my invention as applied to a particular system and as embodying various devices diagrammatically indicated, changes and modifications will be obvious to those skilled in the art and I, therefore. aim in the appended claims to cover all such changes and modifications as fall within the true spirit and scope of my invention.

What I claim as new and desire to secure by Letters Patent of the United States, is:

1. In combination, two electric circuits, a circuit breaker for connecting said circuits, means for impressing a plurality of different voltages across one of said circuits while said circuit breaker is open, and means dependent upon a predetermined relation between the currents produced in said one of said circuits by said voltages for controlling the closing of said circuit breaker.

2. In combination, a supply circuit, a load, circuit, a circuit breaker connecting said circuits, means for opening said circuit breaker, means responsive to the opening of said circuit breaker for first impressing a predetermined voltage across said load circuit and subsequently impressing a relatively higher voltage across said load circuit, and means dependent upon a predetermined relation between the currents produced in said load circuit by said voltages for controlling thte closing of said circuit breaker.

3. In combination, a supply circuit, a load circuit, a circuit breaker connecting said circuits, means for opening said circuit breaker, means responsive to the opening of said circuit breaker for first impressing a predetermined voltage across said load circuit and subsequently increasing the voltage impressed across said load circuit a predetermined amount, and means dependent upon the relation between the currents produced in said load circuit by said voltages for effecting the closing of said circuit breaker when the percent change in the current produced by said change in impressed voltage is less than a predetermined amount.

4. In combination, two electric circuits, a circuit breaker for connecting said circuits, means for impressing a plurality of different predetermined voltages across one of said circuits while said circuit breaker is open, and means dependent upon the percent change in the current produced in said one of said circuits by said voltages for controlling the closing of said circuit breaker.

5. In combination, a supply circuit, a load circuit, a circuit breaker connecting said circuits, means for opening said circuit breaker, means responsive to the opening of said circuit breaker for first impressing a predetermined voltage across said load circuit and subsequently increasing the voltage impressed across said load circuit a predetermined amount, and means dependent upon the percent change in the current produced in said load circuit by said voltage change for effecting the closing of said circuit breaker when the percent change in the current is less than a predetermined amount.

In witness whereof, I have hereunto set my hand this 29th day of August, 1929.

ELMER F. BLISS.